F. W. KREMER.
TIRE.
APPLICATION FILED JULY 7, 1910.
1,099,454.
Patented June 9, 1914.
2 SHEETS—SHEET 1.
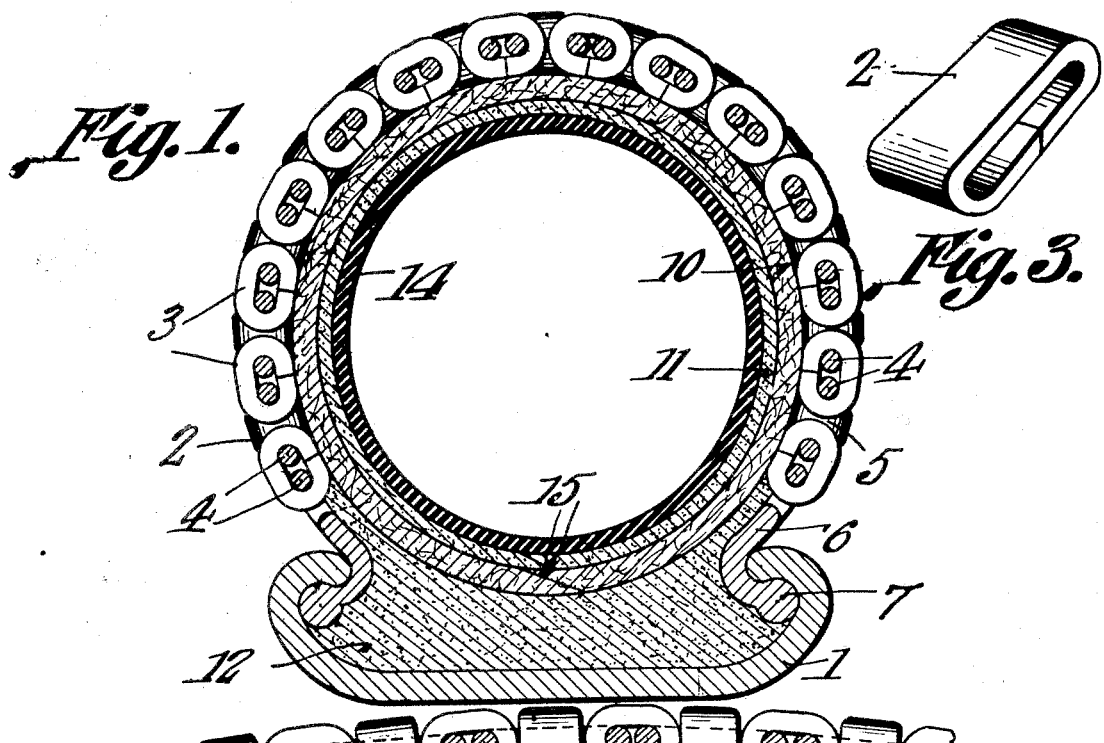
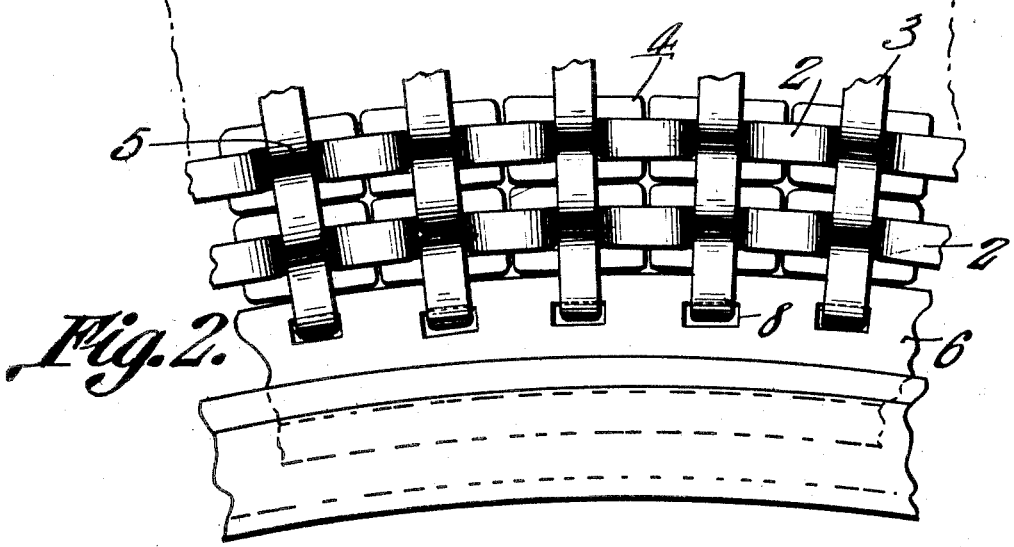
Witnesses
Franklin W. Kremer,
Inventor
by C. A. Snow & Co.
Attorneys

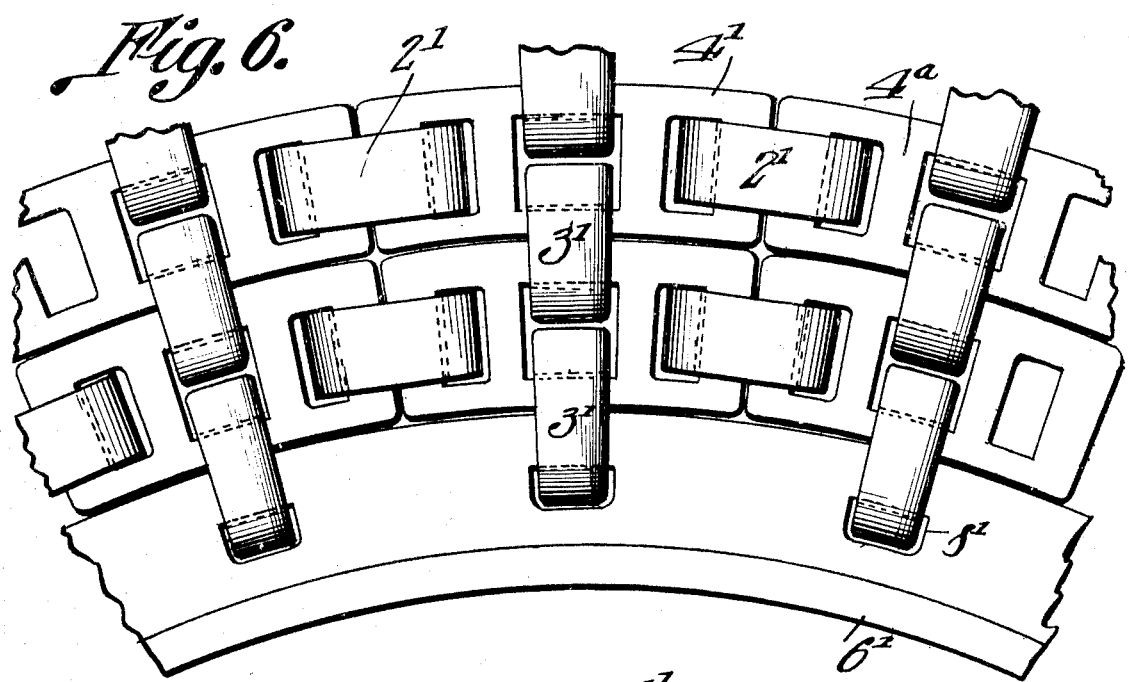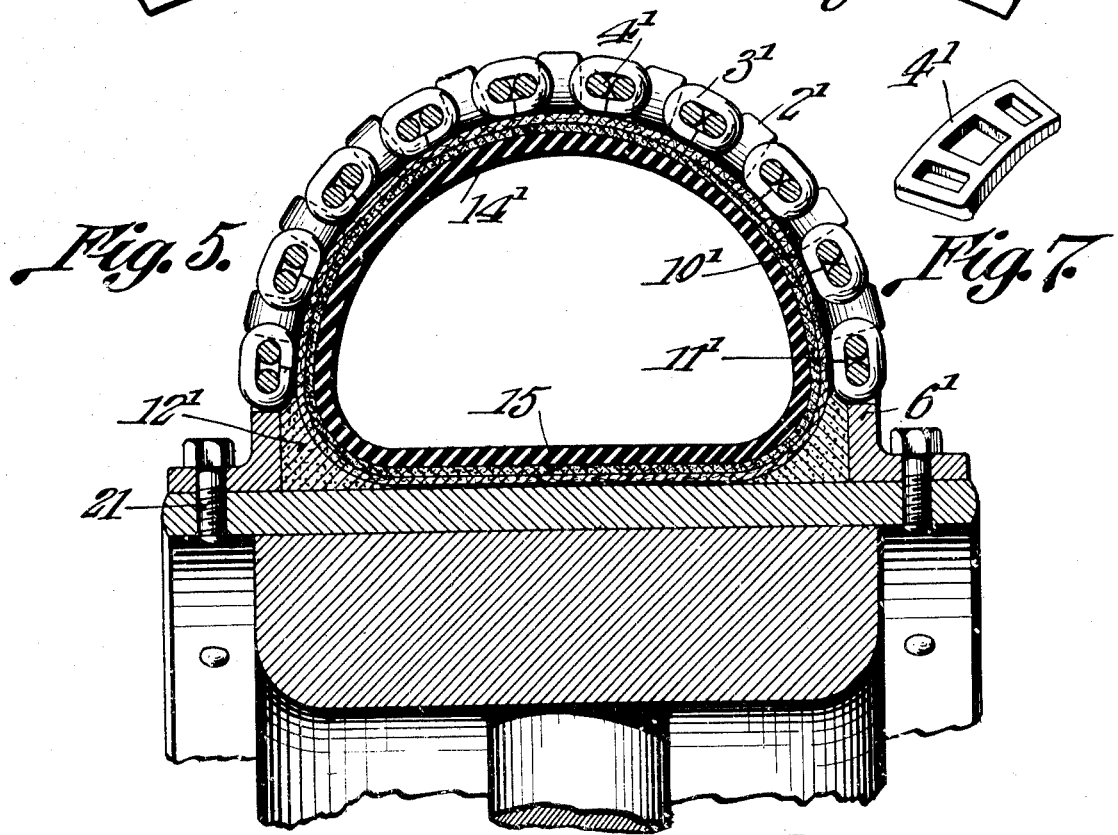

UNITED STATES PATENT OFFICE.

FRANKLIN WILLIAM KREMER, OF CARLSTADT, NEW JERSEY, ASSIGNOR TO UNITED MOTORS COMPANY, OF RUTHERFORD, NEW JERSEY.

TIRE.

1,099,454.　　　Specification of Letters Patent.　　Patented June 9, 1914.

Application filed July 7, 1910. Serial No. 570,833.

*To all whom it may concern:*

Be it known that I, FRANKLIN W. KREMER, a citizen of the United States, residing at Carlstadt, in the county of Bergen and State of New Jersey, have invented a new and useful Tire, of which the following is a specification.

This invention relates to tire protectors.

The principal object of the invention is to provide a metallic tire protector which, while preventing puncture of the tire, will possess the required degree of resiliency.

A further object of the invention is to provide a tire protector which will serve to hold the tire securely in position upon the wheel rim.

A further object of the invention is to provide a tire protector which will prevent slipping or skidding.

Further objects of the invention are generally to improve, strengthen and simplify the construction of tire protectors, as well as to provide means for securely holding them in position upon the wheel rim; to facilitate their removal and replacement; to increase their durability; to prevent them from rattling; to insure free play and movement of the links of the protector with relation to each other so as to prevent them from binding or humping; to cause them to conform snugly in shape to the tire over which they are fitted; to prevent them from wearing or abrading the tire; to avoid any creeping of the protector with relation to the tire; and, generally, to increase their efficiency in use and to decrease the expense attending their manufacture.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claims without departing from the spirit of the invention.

In the accompanying drawings forming part of this specification:—Figure 1 is a cross section through a wheel rim and tire equipped with a tire protector constructed in accordance with the present invention, the tire being also novel in form and adapted particularly for use in combination with the tire protector. Fig. 2 is a detail view showing in side elevation a portion of the tire protector, illustrating particularly the radial arrangement of the transverse links and transverse joints with relation to the axis of rotation of the wheel. Fig. 3 is a detail view showing the construction of the transverse and longitudinal links of the tire protector. Fig. 4 is a similar view showing one of the connecting members or links. Fig. 5 is a view similar to Fig. 1 showing a form of tire and tire protector adapted particularly for use in connection with a heavy truck or vehicle. Fig. 6 is a view similar to Fig. 2, showing the construction illustrated in Fig. 5. Fig. 7 is a detail view showing the form of connecting member or link used in the modified construction shown in Figs. 5 and 6.

Like reference numerals indicate corresponding parts in the different figures of the drawing.

While the improvements of the present invention have been illustrated in connection with an ordinary form of clencher rim indicated by the numeral 1 in Fig. 1, it is to be understood that they may be used in connection with other means for securing them to the wheel.

The tire protector of the present invention is made up of three kinds of links or connecting members which, for convenience, will be referred to herein as the longitudinal links 2, the transverse links 3 and the connecting members 4. The longitudinal links 2 and transverse links 3, preferably, although not essentially, are of the same form and construction as illustrated in detail in Fig. 3 of the drawings. The preferred form of the connecting members 4, to be used in connection with an ordinary automobile tire, is best shown in Fig. 4. Each transverse series of transverse links 3, as shown in Fig. 2, extends on a line which is radial to the center of the wheel. Moreover, the joints 5 between the end portions of the connecting links 4 are also radial to the axis of the wheel as shown in Fig. 2. In order to secure this radial arrangement of the joints between the connecting members 4, it is necessary that the connecting members which are arranged on the side portions of the tire, as distinguished from the tread portion thereof, shall have their ends cut on lines which are radial to the axis of the wheel, so that when the connecting members are assembled with their end portions approximately in contact with each other as shown in Fig. 2, the joints therebetween, as described, will be radial to the center of the wheel. In order to accomplish this result, it is desirable that the connecting members 4 which are nearest the wheel felly shall be comparatively small and that said connecting members 4 as they approach the tread portion of the tire shall be slightly larger than the connecting members which are nearer the center of the wheel. In other words, the connecting members 4, as shown in Fig. 2, are arranged in a plurality of radial sets or series, each radial set of connecting members starting at a point adjacent the wheel felly on one side of the tire and extending outward around the tire and backward to a point adjacent the felly on the other side of the tire, and the connecting members forming each radial set are gradually increased in size from the felly outward to a point adjacent the tread portion of the tire. The radially extending joints 5, of course, separate the different radial groups or sets of connecting members 4 from each other. By reason of the fact that said connecting members are gradually increased in size from the side portions of the tire outward toward the tread portion thereof, and that the end portions of said connecting members 4 are cut in such manner as to be radial to a common center, as shown, said connecting members fit snugly together to form a protecting structure which conforms exactly in shape to the tire over which it is fitted.

Means are provided for securing the tire protector in position upon the tire, and while I prefer to employ for this purpose anchoring members or rings such as are indicated by the numeral 6, it is to be understood that other devices may be employed for this purpose.

The anchoring rings or members 6 preferably are angular in cross section as shown in Fig. 2 and are provided with enlarged inner portions 7 which are suitably held within the clencher rim 1 as shown.

The anchoring members 6 by holding the tire protector in position upon the tire serve to prevent displacement of the tire and also prevent any creeping of the protector with relation to the tire. The anchoring or retaining members 6 are formed with as many openings or perforations 8 as there are radial sets of transverse links 3. The two innermost links 3 of each radial set, that is, the links which are nearest the center of the wheel, are secured to the two retaining members or rims 6 by being fitted into the openings 8 therein. As shown clearly in Fig. 2, the transverse links 3 which are nearest the center of the wheel are narrower than the transverse links 3 which are nearest the tread portion of the wheel. Moreover, the side edges of the transverse links 3 are cut on lines radial to the wheel. For this reason, the transverse links 3 gradually widen from the wheel rim outward toward the tire tread on lines radial to the center of the wheel. Each radial set or group of longitudinal links 2 is shaped so as to increase gradually in size from the rim portions of the wheel outward toward the tread portions of the tire as shown and the ends of each longitudinal link are cut on lines radial to the center of the wheel as shown. It is to be understood of course that the shape of the different links is gradually altered toward the tread portion of the tire, and that on the tread portion, the connecting members 4 are approximately rectangular in shape.

The tire protector of the present invention with its transverse and longitudinal links and its connecting members all gradually increasing in size on radial lines from the wheel rim outward toward the tread portion of the tire, fits the tire with the ease, elasticity and snugness of a glove. Moreover, the links have such freedom of movement with relation to each other that the resiliency of the tire is not affected in any appreciable degree, and there is no possibility of the links piling or crowding onto each other and thus humping or interfering with the freedom of the rotation of the wheel.

It will be noted from Fig. 1 of the drawing that the transverse links are so shaped as to fit snugly around the portions of the connecting members 4 with which they are in engagement, and that said portions of the connecting members 4 preferably are round in cross section so as to fill the ends of the transverse links. This arrangement prevents undue rattling of the connecting members and links with relation to each other. The longitudinal links 2 have the same snug and exact fit with the connecting members 4 as the transverse links. The joints in the transverse and longitudinal links preferably are disposed on the inside of the tire protector, that is, on the portion thereof next to the tire. It will be noted that merely the longitudinal and transverse links are in contact with the tire, and that the connecting members 4 are held away from the tire and likewise away from the tread portion of the protector, by the longitudinal and transverse links. It will also be noted from Fig. 1 that each of the connecting members 4 is slightly curved so as to conform to the shape of the tire.

The links 3 of each radial set of transverse links are arranged end to end. In other words, the different transverse links 3 in each radial set, practically abut against each other at the end portions thereof. Thus it will be seen that the connecting members 4 are relieved from thrusts exerted through the links 3 and consequently said connecting members 4 can be made of relatively light material without danger of buckling. Furthermore as the links 3 abut within the members 4 they are practically held against sliding movement relative to the connecting members and wear upon the tire body is thus greatly reduced. The longitudinal links 2 in each longitudinal series of said links are separated from each other by the transverse links 3 as shown in Fig. 2. In other words the end portions of each pair of transverse links 3 are set in between the end portions of each pair of longitudinal links 2. By thus arranging the transverse and longitudinal links within the connecting members 4, the longitudinal links are held against inward sliding movement relative to the connecting members by the transverse links.

Each radial series of transverse links 3 serves to prevent any slipping of the wheel on which the tire protector is mounted, and each longitudinal series of the longitudinal links 2 of the tread portion of the tire, serves to prevent any skidding of the wheels. In addition to the links and connecting members formed preferably of high carbon steel the tire protector includes a casing 10 formed preferably of rawhide or leather, a cushion 11 formed preferably of felt or other similar material and a suitable heat absorbing base 12 formed preferably of fibrous material suitably molded into shape.

The reference numeral 14 indicates the inner tube or tire proper. The protecting members 10 and 11 are folded around the inner tube 14 and are formed preferably with end portions cut on an incline as indicated at 15.

The modified construction illustrated in Figs. 5, 6 and 7 is adapted particularly for use on the wheels of heavy motor trucks. In this form, the anchoring members or retaining rings 6' are angular in cross section the same as in Fig. 1 and are secured to the wheel rim 20 by means such as the bolts 21. The inner tube 14' and the casing 10' and cushion 11' are of a shape suitable for heavy vehicles. The heat absorbing material 12' is arranged in a slightly different manner as shown. The particular difference between the modified construction shown in Figs. 5, 6 and 7 and that shown in Figs. 1 and 2 is that the connecting members 4' are formed with intermediate spacing bars 4ª, which are disposed in between the ends of the longitudinal links 2' and the transverse links 3'. The connecting members, transverse and longitudinal links, are otherwise shaped and formed in the same manner as described with respect to Figs. 1 and 2. That is to say all of these members increase gradually in size on radial lines from the tire outward toward the rim of the wheel so as to form a tire protector which covers all portions of the tire and the joints between the members of which are so small as to prevent the entrance of nails or other sharp projections calculated to puncture the tire.

It is to be understood that while I prefer to use the metallic casing together with the rawhide cover and felt cushion as a unitary tire, I may nevertheless use the metallic link casing in connection with other forms of tires proper. In other words, the metallic link casing may be used separately as an ordinary tire protector, or it may be combined with the rawhide cover and felt cushion to form a unitary tire structure.

What is claimed as new is:—

1. A metallic rim-engaging tire casing provided with a plurality of substantially rectangular connecting members arranged to contact and having openings, series of transverse links formed of strips of approximately flat metal and engaging the openings in the members and abutting within said openings to relieve the members from thrusts exerted through the links and to hold each other against sliding movement relative to the connecting members, and series of longitudinal links engaging the connecting members and holding said members together at their ends.

2. A metallic rim-engaging tire casing provided with a plurality of substantially rectangular connecting members arranged to contact and having openings, series of transverse links formed of strips of approximately flat metal and engaging the openings in the members and abutting within said openings to relieve the members from thrusts exerted through the links, to hold said members together at their sides and to hold each other against sliding movement relative to the connecting members, and series of longitudinal links extending into the openings within the connecting members and held by said transverse links against inward sliding movement relative to the connecting members, said longitudinal links holding the connecting members together at their ends.

In testimony that I claim the foregoing as my own, I have hereto affixed my signature in the presence of two witnesses.

FRANKLIN WILLIAM KREMER.

Witnesses:
FRANK DE WITT,
FRANK WORSUOPP.